Figure 1:
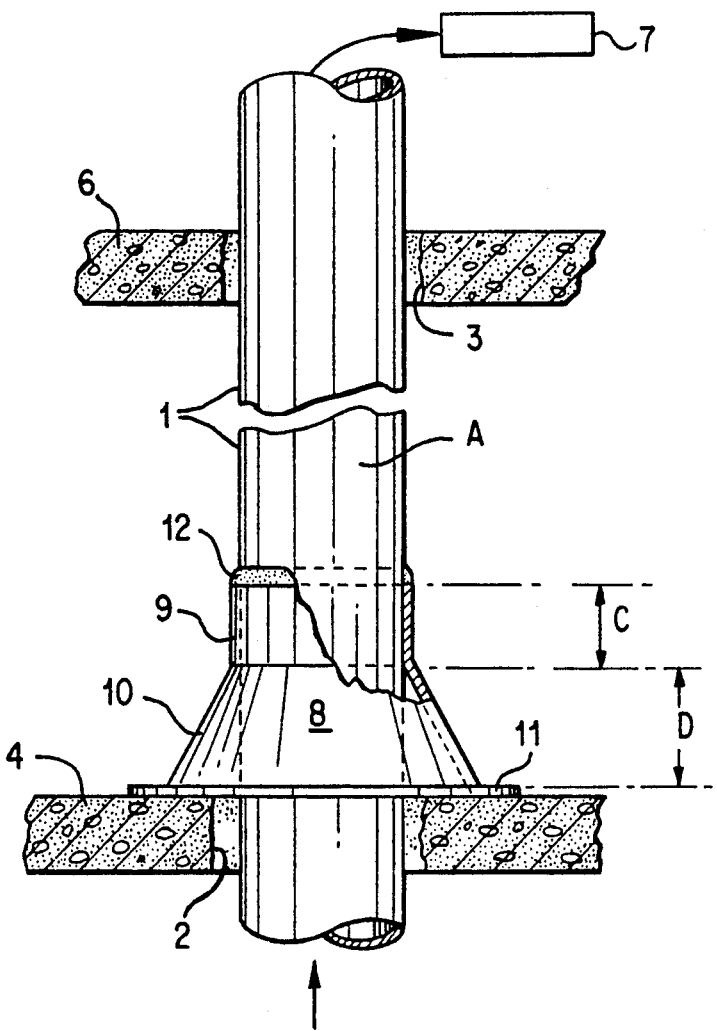

United States Patent [19]

Sasin

[11] Patent Number: 5,120,009
[45] Date of Patent: Jun. 9, 1992

[54] COPPER WATER PIPE HANGER

[76] Inventor: Donald J. Sasin, 12 Lake Rd., Canton, Mass. 02021

[21] Appl. No.: 678,645

[22] Filed: Apr. 1, 1991

[51] Int. Cl.[5] ............................................. F16L 5/00
[52] U.S. Cl. ..................................... 248/56; 248/74.1
[58] Field of Search ............... 248/56, 27.1, 74.1; 285/64, 42, 189, 192, 162; 52/221, 199, 232, 34; 137/360, 365

[56] References Cited

U.S. PATENT DOCUMENTS

| 312,193 | 2/1885 | Duffy | 248/56 |
|---|---|---|---|
| 616,005 | 12/1898 | McGahan | 285/64 |
| 1,765,458 | 6/1930 | Siebs | 52/221 |
| 2,816,574 | 12/1957 | Bots | 285/64 X |
| 3,105,664 | 10/1963 | Poradun | 248/56 |
| 3,365,152 | 1/1968 | Blunk | 248/56 |
| 4,516,749 | 5/1985 | Sullivan | 248/56 |
| 4,550,451 | 11/1985 | Hubbard | 285/64 X |

FOREIGN PATENT DOCUMENTS 303406  8/1968  Sweden ........................... 248/56

*Primary Examiner*—J. Franklin Foss
*Attorney, Agent, or Firm*—James H. Grover

[57] ABSTRACT

A vertical copper water pipe extending through a hole in a building floor is supported by a hanger which has a tubular collar which snugly fits the pipe and is soldered thereto. A cone depending from the collar flares to a flange so as to strengthen the hanger, and to provide an annular foot which has a substantially greater diameter than the collar and which bears on the floor so as to cover the floor hole and distribute the weight of the pipe and its water content.

6 Claims, 1 Drawing Sheet

COPPER WATER PIPE HANGER

BACKGROUND OF THE INVENTION

In the installation of vertical water pipes from the cellar through holes in the upper floors of a building, the vertical sections of pipe, usually in standard twelve foot lengths, are unsupported until connected at each end to a water main in the cellar and to plumbing fixtures on the upper floors. Until the end connections are made, it is highly efficient to support the vertical pipe sections to permit one plumber to make the end connections unassisted And, because copper pipe deteriorates under stress, it is highly desirable permanently to relieve the weight of the pipe and its water content on the copper end connections.

It is the object of the present invention to provide a pipe hanger conveniently providing both an initial and a permanent support for vertical pipe sections extending through floor holes of a building.

SUMMARY OF THE INVENTION

According to the invention a hanger for supporting copper water pipe vertically through holes in building floors comprises a sheet metal body integrally including a collar, a flaring cone depending coaxially from the collar, and a flange extending radially from the cone, the body being formed of solid copper of the same purity as standard copper water pipes and compatible with solder for copper pipe. The collar has a constant inside diameter snugly fitting around a standard copper pipe for a solder connection of the collar end to the pipe; and the flange forms an annular foot with a substantial area at right angles to the axis of the collar, the foot having a substantially greater diameter than the collar so as to cover the floor hole through which the pipe extends without cutting into the floor, while supporting the weight of the pipe to which the collar is soldered.

DRAWING

Figure 2:
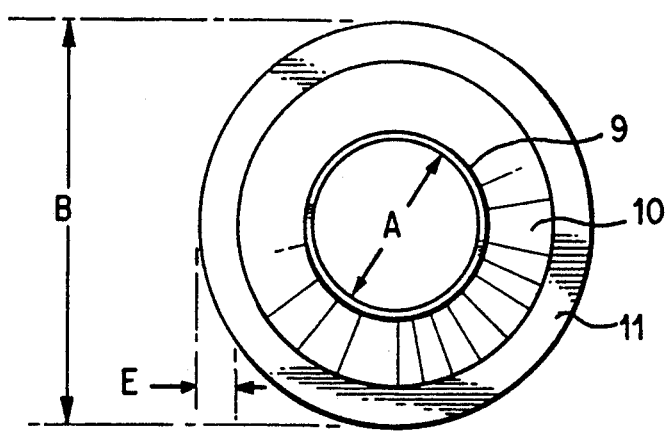

FIG. 1 is a vertical side elevation of a water pipe supported between building floors by a pipe hanger according to the invention; and FIG. 2 is a plan view of the pipe hanger.

DESCRIPTION

In FIG. 1 a typical home installation of a copper water pipe 1 runs from a cellar through holes 2 and 3 in wooden first and second floors 4 and 6 to plumbing 7 above the second floor. The hole size must allow some leeway for lateral adjustment of the pipe, but this leaves a path for drafts and fire from the cellar to the upper floors. According to the invention initial and permanent support for the copper water pipe is provided by a hanger 8 shown installed in FIG. 1 and alone in FIG. 2.

The hanger comprises at its top a straight tubular collar 9 from which a downwardly flaring cone 10 depends coaxially with the collar. At the lower end of the cone is an annular flange forming a foot 11 resting on the floor. As so described in barest detail, the hanger might superficially resemble other articles, such as funnels, useful for entirely different purposes. But it also embodies a novel group of characteristics enabling it to serve as a pipe hanger in new ways.

The collar, cone and foot are integrally formed of solid sheet copper, about 20 mils thick, of the same purity as standard SPS copper water pipe. Copper plated pipe of other metals will corrode inherently and because the hangar is attached to the water pipe by a bead of solder 11 applied around the top of the collar 9 with a torch. This attachment is conveniently made when a length of copper pipe 1 is first located loosely through the floor holes 2 and 3. In addition to the requirement that the collar be of a metal such as copper compatible with standard water pipe, the inner diameter of the collar (A, FIG. 2) must be constant and snugly fitting around standard copper water pipes. Preferred inner collar diameters are $\frac{1}{2}$, $\frac{5}{8}$, $\frac{7}{8}$, 1, 1 $\frac{1}{4}$, 1 $\frac{3}{8}$, and 1 $\frac{5}{8}$ inches. Collar lengths (C, FIG. 1) are not critical but should be at least approximately one half or five eights inches.

The cone flares downwardly from the collar diameter to the foot 11 an axial length (D, FIC. 1) of about $\frac{3}{4}$ inch, which allows for a foot 10 at least approximately two inches in diameter ((B, FIG. 2). A preferred radial width (E, FIG. 2) is approximately $\frac{1}{4}$ inch. Such a diameter and width will provide a foot area distributing the weight of the pipe and its water content on the floor, and which will not cut or dig into the floor lowering the pipe and later placing stress on the pipe and plumbing fixtures above and below. With a preferred foot diameter B two to three times the collar diameter the foot also functions to cover the floor hole 2 and block the flow of drafts and fire by-products from the cellar.

I have found that the area of the foot flange at right angles to the axis A1 of the collar should be substantial—in the same order of area as the cross sectional area inside the collar and at least one half that cross sectional area, and up to one and one quarter times the area inside the collar.

It should be understood that the present disclosure is for the purpose of illustration only, and that the invention includes all modifications and equivalents falling within the appended claims.

I claim:

1. A hanger for supporting a copper water pipe vertically through holes in building floors comprising:
   a sheet metal body integrally including a collar, a flaring cone depending coaxially from the collar, and a flange extending radially from the cone, wherein:
   the body is formed of solid copper of the same purity as standard copper water pipes and compatible with solder for copper pipe;
   the collar has a constant inside diameter snugly fitting around a standard copper pipe for a solder connection of the collar end to the pipe; and
   the flange forms an annular foot with a substantial area at right angles to the axis of the collar, the foot having a substantially greater diameter than the collar so as to bear the weight of the pipe and cover the floor hole through which the pipe extends without cutting into the floor.

2. A hanger according to claim 1 wherein the outer diameter of the foot is two to three times the collar diameter.

3. A hanger according to claim 1 wherein the foot has a substantial area at right angles to the axis of the collar.

4. A hanger according to claim 3 wherein the foot area is in the same order as the cross sectional area inside the collar.

5. A hanger according to claim 4 wherein the foot area is at least one half the cross sectional area inside the collar.

6. A hanger according to claim 4 wherein the foot area is between one half and one and one quarter times the cross sectional area inside the collar.

* * * * *